N. C. CHRISTENSEN.
METHOD OF OBTAINING A CONCENTRATED SO₂ SOLUTION.
APPLICATION FILED JULY 3, 1917.
1,341,734.
Patented June 1, 1920.
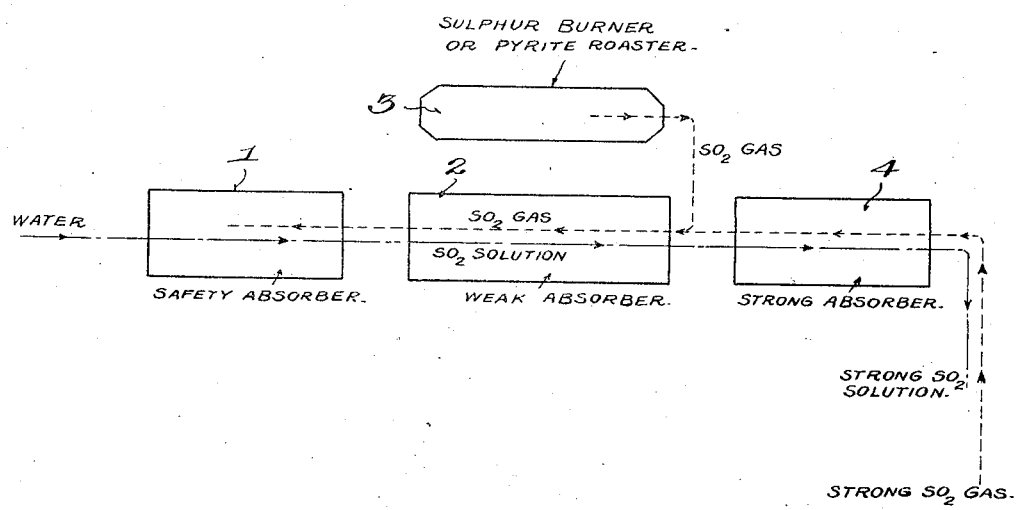

UNITED STATES PATENT OFFICE.

NIELS C. CHRISTENSEN, OF SALT LAKE CITY, UTAH, ASSIGNOR OF ONE-HALF TO J. E. BARLOW, OF HABANA, CUBA, AND ONE-HALF TO BIG INDIAN COPPER COMPANY, OF STATE OF UTAH.

METHOD OF OBTAINING A CONCENTRATED $SO_2$ SOLUTION 1,341,734.      Specification of Letters Patent.      Patented June 1, 1920.

Original application filed September 1, 1916, Serial No. 118,156. Divided and this application filed July 3, 1917. Serial No. 178,442.

*To all whom it may concern:*

Be it known that I, NIELS C. CHRISTENSEN, a citizen of the United States, residing at Salt Lake City, in the county of Salt Lake and State of Utah, have invented certain new and useful Improvements in Methods of Obtaining a Concentrated $SO_2$ Solution; and I do hereby declare that the following is a full, clear, and exact description of the same, reference being had to the accompanying drawings, forming part of this specification.

This invention relates to a method of obtaining a solution of sulfur dioxid, $SO_2$, in an $SO^2$ absorbent menstruum, such as water. The primary object in view is the provision of an improved method of absorbing $SO_2$ gas in a suitable absorbent menstruum, whereby a concentrated $SO_2$ solution is obtained.

The concentrated $SO_2$ solution obtained by practising the method of this invention is especially useful in connection with the lixiviation of copper ores for the recovery of copper, for example, in the lixiviation method disclosed in my co-pending application filed September 1, 1916, Serial No. 118,156, of which the present application is a division. It will be understood, however, that the concentrated $SO_2$ solution obtained by this invention is not necessarily limited in its useful application to the art of lixiviating copper, but may be applied to other useful applications as well.

The accompanying drawing illustrates diagrammatically an apparatus employed in carrying out the present improved method, and the several steps constituting the same.

Before setting forth in detail the method, the principles underlying the same and on which successful results are dependent, will first be briefly set forth. It is well understood that, in order to secure an efficient absorption of $SO_2$ gas, absorption apparatus of sufficient capacity must be used and there must also be a sufficient volume of the absorbent menstruum. While these elements necessary for efficient absorption present no serious difficulties, the maximum strength of the solution finally obtained, or the degree of concentration which may be secured in an absorption apparatus is, however, not determined to any great extent by the efficiency of the apparatus. On the other hand the strength or degree of concentration of the $SO_2$ solution depends almost entirely upon the percentage of $SO_2$ in the gas supplied to the absorption apparatus. The degree of concentration of the solution is directly proportional to the partial pressure of $SO_2$ in the gas supplied to the absorption apparatus. For example, if a six per cent. $SO_2$ gas by volume is supplied to the apparatus, a solution carrying only six per cent. of the maximum strength of solution made from pure $SO_2$ gas could be obtained. Assuming that water employed as the absorbent menstruum is at 20° C., and using pure $SO_2$ gas, a solution containing about 12% pure $SO_2$ may be obtained. If, however, the gas contain only 18% $SO_2$; *i. e.*, the richest gases from a sulfur burner, a solution carrying a little over 2%-$SO_2$ might be obtained, while, if a 6% $SO_2$ gas be used, *i. e.*, the gases from a roasting furnace, the solution obtained would contain only about .7% $SO_2$.

From the above it is conclusive that the process of obtaining a concentrated solution of $SO_2$ cannot be made a success by utilizing only a dilute roaster gas, as has been heretofore attempted. Relatively strong solutions necessarily cannot be secured from relatively dilute gases in any absorption apparatus. In accordance with the present invention, it has been ascertained that, in order to secure a strong and concentrated solution of $SO_2$, dilute gases must first be absorbed in an absorption apparatus to form a weak solution, and this weak solution must then be enriched by further absorption of $SO_2$ in another absorber or another section of the absorption apparatus, to which richer gases are supplied. The above is one of the most important elements of the process and results in obtaining a highly concentrated $SO_2$ solution, suitable for lixiviation purposes and for many other useful applications.

As shown in the accompanying drawings, the absorbent menstruum, usually water, is passed through the first section of the absorption apparatus, indicated by the reference character 1, and absorbs the $SO_2$ gas escaping from the second section of the absorption apparatus, thereby utilizing all the residual gas from the second section of the absorption apparatus. To this second section 2 the relatively weak solution passes and absorbs $SO_2$ gases supplied from a roaster or sulfur burner 3. Also supplied to the second section of the absorption apparatus are $SO_2$ gases escaping from the third section of the apparatus, indicated in the drawing by the reference character 4. From the second section, the solution of water and $SO_2$ is next passed through the third section, and saturated to the desired extent. Very strong, or relatively pure $SO_2$ gases are supplied to the third section of the apparatus from a boiler or precipitate roaster, such as is mentioned in my said co-pending application.

In practising the foregoing method, a strong or highly concentrated solution of $SO_2$ in the absorbent menstruum is secured. Furthermore, all escape of $SO_2$ gases involving loss of $SO_2$ is cut off, as residual gases from successive sections of the apparatus or successive absorbers are utilized to saturate the solution passing through preceding sections of the apparatus. It will be noted further that the solution is subjected to successive absorptions of $SO_2$ in the order in which the $SO_2$ gases increase in $SO_2$ content. The unsaturated solution or fresh water in the first section of the absorption apparatus is caused to absorb $SO_2$ from gases containing a comparatively small quantity of $SO_2$ and thus all the $SO_2$ is utilized; whereas in the third section of the apparatus the solution is partially saturated with $SO_2$ and is brought into absorbing relation with practically pure $SO_2$ gases.

Obviously, more than three absorbers or sections of the absorption apparatus might be used, the number of sections being determined by the strength of the solution desired and the use to which the concentrated solution is put. In most cases, however, it will be found that three sections are amply sufficient for obtaining a highly concentrated solution of $SO_2$ in the absorbent menstruum.

What is claimed is:

1. In a process in which a concentrated $SO_2$ solution is deprived of part of its $SO_2$ and is later caused to absorb the $SO_2$ so deprived, the step of replacing the losses of $SO_2$ to the system consisting in: causing the weakened solution to first absorb the relatively weak replacement $SO_2$, and then causing the absorption by the thereby strengthened solution of the relatively strong $SO_2$ gas previously taken from the solution.

2. In a device for obtaining a concentrated $SO_2$ solution, a source of supply of relatively pure $SO_2$ gas, a separate source of supply of relatively weak $SO_2$ gas, a safety absorber, a weak absorber, a strong absorber, means for passing an $SO_2$ absorbent menstruum through said absorbers in the order mentioned, means for conveying the relatively pure $SO_2$ gas to the strong absorber, means for conveying relatively weak $SO_2$ gas and the residual gas from the strong absorber to the weak absorber, and means for passing the residual gas from the weak absorber to the safety absorber.

NIELS C. CHRISTENSEN.